No. 703,882. Patented July 1, 1902.
T. WRIGHT.
STEAM ROAD ROLLER.
(Application filed Feb. 26, 1902.)

(No Model.) 3 Sheets—Sheet 1.

No. 703,882. Patented July 1, 1902.
T. WRIGHT.
STEAM ROAD ROLLER.
(Application filed Feb. 26, 1902.)

(No Model.) 3 Sheets—Sheet 2.

WITNESSES: INVENTOR.
ATTORNEY.

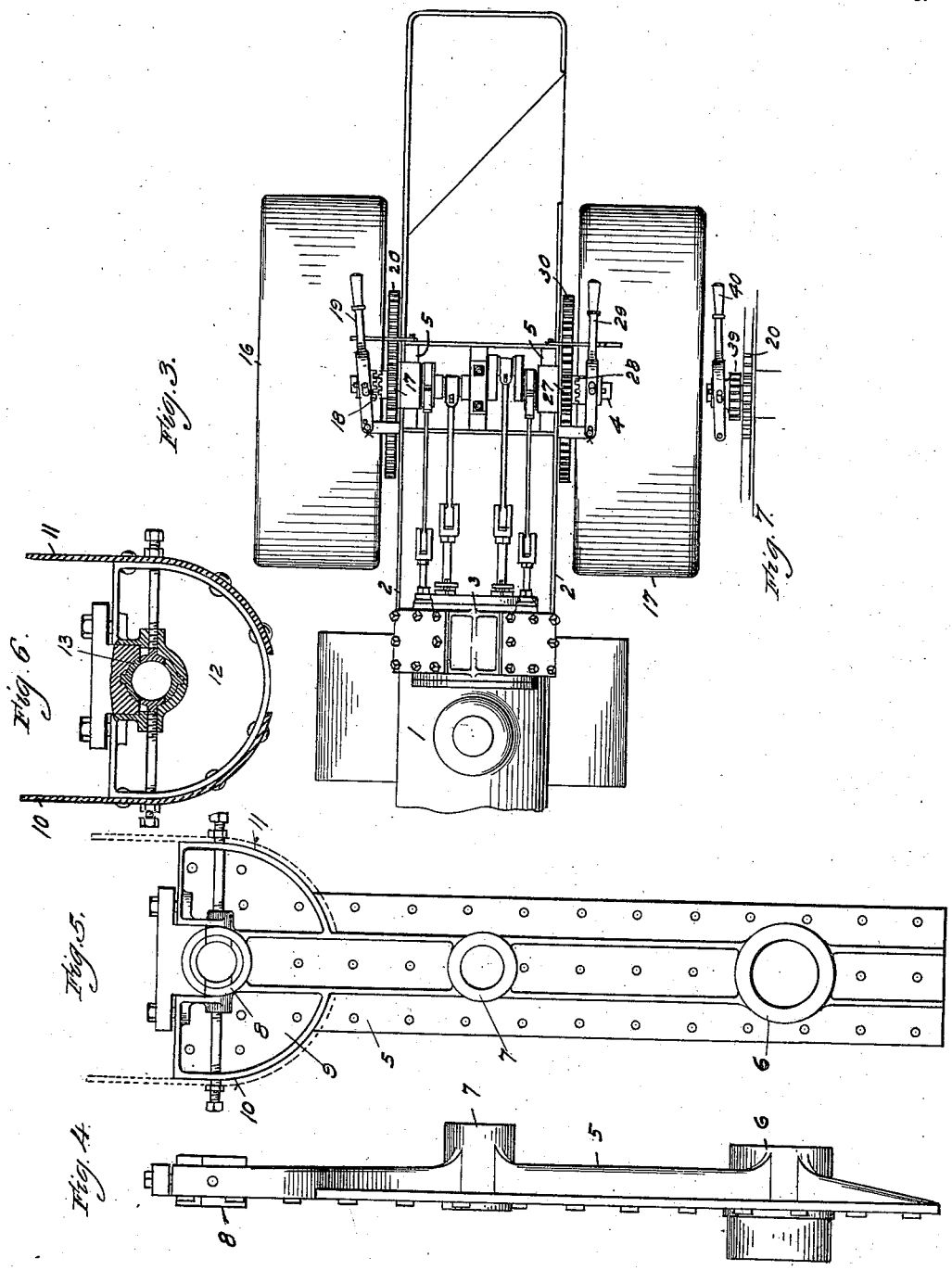

UNITED STATES PATENT OFFICE.

THOMAS WRIGHT, OF SPRINGFIELD, OHIO.

STEAM ROAD-ROLLER.

SPECIFICATION forming part of Letters Patent No. 703,882, dated July 1, 1902.

Application filed February 26, 1902. Serial No. 95,791. (No model.)

*To all whom it may concern:*

Be it known that I, THOMAS WRIGHT, a subject of the King of Great Britain and Ireland, residing at Springfield, in the county of Clark and State of Ohio, have invented certain new and useful Improvements in Steam Road-Rollers, of which the following is a specification, reference being had therein to the accompanying drawings.

This invention relates to steam road-rollers, and more particularly to the construction of the mechanism whereby motion is imparted from the engine to the rear rollers or driving-wheels.

My present invention has for its object to overcome certain objections attendant upon such rollers as ordinarily constructed; and to these ends my invention consists in certain novel features, which I will now proceed to describe and will then particularly point out in the claims.

Figure 1:
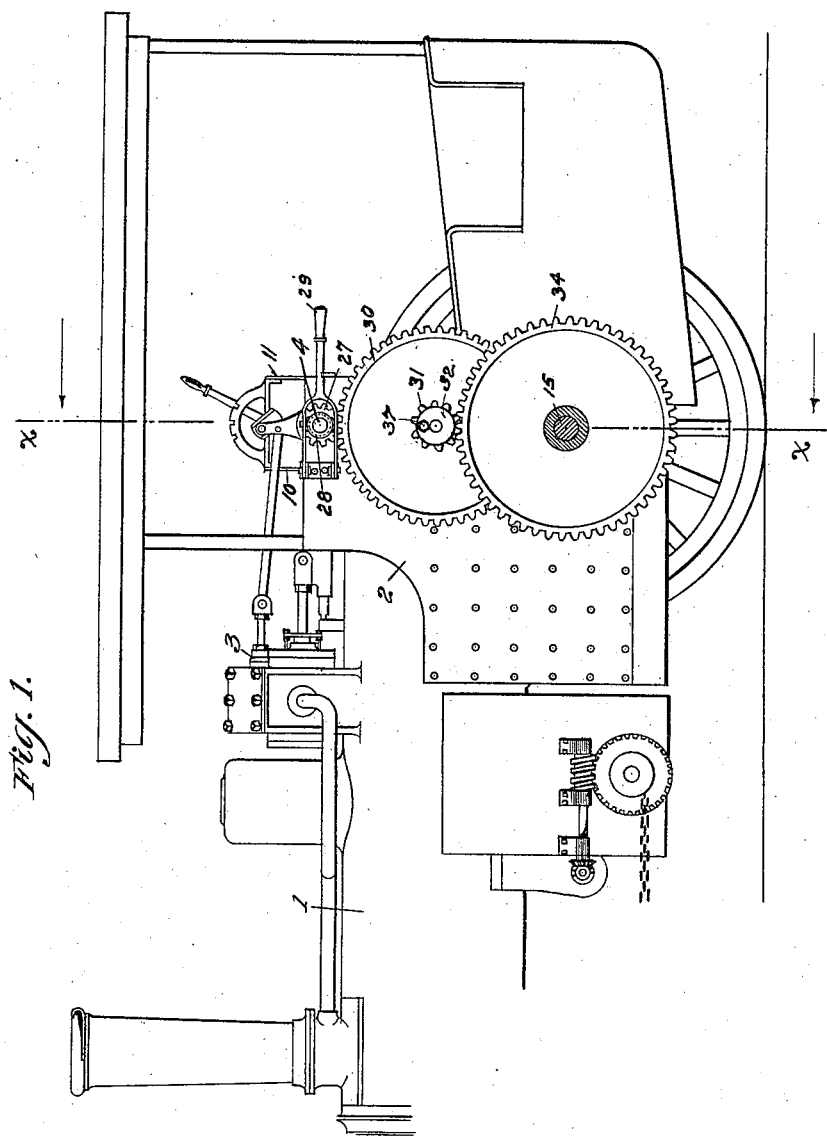
Figure 2:
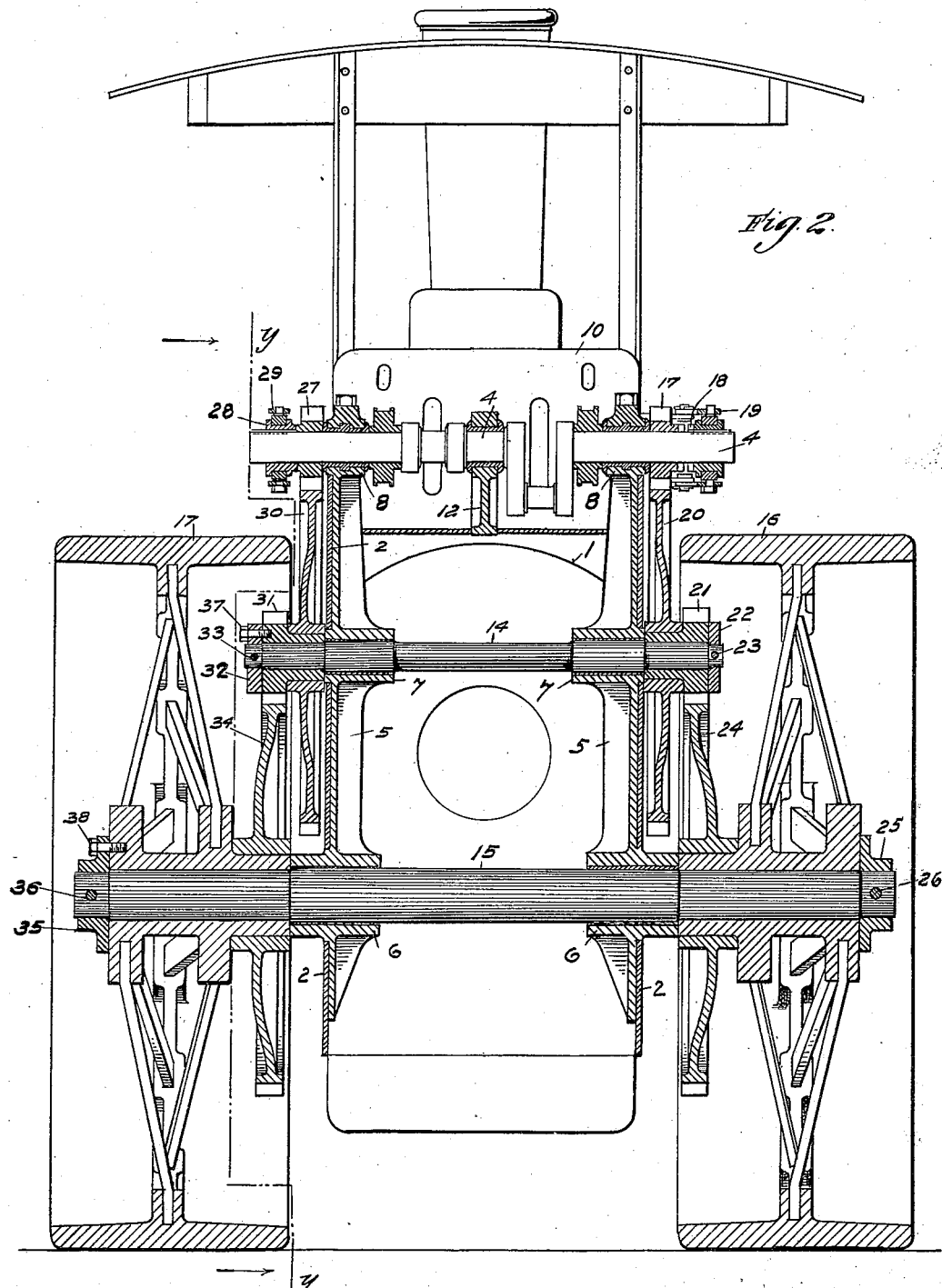

In the accompanying drawings, Figure 1 is a side elevation of a roller embodying my invention in one form, the same being partly in section upon the line $y\ y$ of Fig. 2. Fig. 2 is an enlarged vertical section taken on the line $x\ x$ of Fig. 1 and looking in the direction of the arrows. Fig. 3 is a plan view of the rear portion of the roller. Fig. 4 is an edge view of one of the side housings; Fig. 5, an inner face view thereof; Fig. 6, a detail sectional view showing the middle bearing of the engine-shaft; and Fig. 7, a detail view of a modified form of a portion of Fig. 3.

In the said drawings, 1 indicates the boiler, supported at its forward end by a suitable steering-roller, and 2 the extension-plates thereof extending rearwardly therefrom.

3 indicates the engine as a whole, and 4 the engine-shaft. Secured to the inner face of each extension-plate is a side housing 5, which carries the bearings for the rear axle, intermediate shaft, and engine-shaft. Each housing is made in one piece, as indicated in Figs. 3 and 4, and is provided with a boss 6 near its lower end to receive the main axle, a boss 7 about midway of its height to receive the intermediate shaft, and a boss or box 8 to receive the engine-shaft near its upper end. Each housing is provided with an enlarged U-shaped head 9, and these two heads are connected at the front and rear by cross-plates—to wit, a spectacle-plate 10 at the front and a guard-plate 11 at the back, having their body portions vertical and their lower portions bent to fit the curved surfaces of the heads 9. These plates are, however, above and independent of the boiler, so as to be free from any connection therewith, and therefore unaffected by its movements arising from contraction and expansion due to variations in temperature. The cross-plates 10 and 11 have secured to them centrally a housing 12, which carries a bearing 13, in which the center of the shaft 4 is supported independently of the boiler, so that said shaft is provided with both end bearings and a central bearing, which are in turn supported by the side housings independently of the boiler, thereby giving the said shaft proper support. Moreover, since the engine-shaft, intermediate shaft, and rear axle are all supported in the side housings they are maintained in correct relative position with respect to each other. The intermediate shaft is indicated at 14 and the rear axle at 15.

The rear rollers or driving-wheels are indicated at 16 and 17, respectively, and are independent of each other, being independently connected with the engine-shaft by separate trains of gearing, each of which is capable of being independently connected with or disconnected from the engine-shaft.

In Figs. 1, 2, and 3 I have illustrated a construction in which the engine-shaft is provided at one end with a pinion 17, loosely mounted on said shaft and adapted to be connected therewith by a clutch 18, controlled by a lever 19. The pinion 17 meshes with a gear 20, which is secured to or formed in one piece with a pinion 21, the two being mounted so as to revolve freely on the intermediate shaft 14 and being held in position by any suitable means—as, for instance, a collar 22 and pin or bolt 23. The pinion 21 meshes with a gear 24, secured on the hub of the driving-wheel 16, which is itself loosely mounted on the axle 15 and held in position by any suitable means—as, for instance, a collar 25 and pin 26. On the other end of the engine-shaft 4 there is mounted a pinion 27, itself loose on the shaft, but adapted to be connected therewith by a clutch 28, controlled by a lever 29. The pinion 27 meshes with a gear 30, which is formed in one piece with or secured to a pinion 31, the two being mounted on the other end of the intermediate shaft 14 and held in position thereon by any suitable means—as, for instance, by a collar 32 and pin 33. The pinion 31 meshes with a gear 34, secured on the hub of the driving-wheel 17, which latter is mounted on the axle 15 and held thereon by any suitable means—as, for instance, a collar 35 and pin 36. The connection between the gear 30 and pinion 31 and intermediate shaft 14 may be either a fast or a loose one; but I prefer the former and have shown such a connection, it being effected by means of a bolt 37, passing through the collar 32 and into the hub of the pinion 31 or in any other suitable manner. Similarly the wheel 17 may be either fast or loose on the axle 15; but I prefer a fast connection, which may be effected in any suitable manner—as, for instance, by a bolt 38, passing through the collar 35 and into the hub of the wheel 17.

In steam road-rollers as usually constructed the rear axle is positively driven from the engine-shaft by means of a single train of gearing, and the driving-wheels are connected to said axle by means of pins, which may be withdrawn, so as to disconnect either of the wheels from the axle when it becomes necessary to make a short turn. This operation involves considerable time, including a stoppage of the roller for a period long enough to enable the operator to dismount and remove the pin and again assume his working position, the same or a greater amount of time being required when the driving-wheel is again connected to the axle. By reason of my improved construction either driving-wheel may be at once disconnected from the source of power by simply releasing the clutch on that side of the machine, which operation is effected by the operator practically instantaneously and without leaving his position. The driving-wheel may again be connected with the source of power with equal facility and rapidity when desired. It will also be understood that both driving-wheels may be disconnected at any time, if desired. Moreover, the construction is simple and efficient, employing only one intermediate shaft between the engine-shaft and driving-wheels, and the driving strains are equalized on all the bearings on both sides of the machine under normal conditions of operation.

It will be understood that the independent connecting and disconnecting of the driving-wheels with or from the engine-shaft may be effected by mechanism other than that shown in Figs. 1, 2, and 3. For instance, I have shown in Fig. 7 a modified construction in which, instead of employing a loose pinion on the engine-shaft and a clutch splined thereon and engaging said pinion, a pinion 39 is employed, splined on the engine-shaft and adapted to be operated by a hand-lever 40, so as to be shifted into or out of mesh with the gear 20.

Other modifications in the details of construction of the apparatus may be made, and I therefore do not wish to be understood as limiting myself to the precise details of construction hereinbefore described and shown in the accompanying drawings.

Having thus fully described my invention, what I claim as new, and desire to secure by Letters Patent, is—

1. In a steam road-roller, the combination, with a rear axle, and driving-wheels mounted thereon and capable of independent motion, each driving-wheel being provided with a gear, of an engine-shaft provided with independent driving-pinions, an intermediate shaft provided at each end with a gear to mesh with said pinion and with a pinion to mesh with the driving-wheel gear, each intermediate gear and pinion being connected to move in unison with each other and independently of the intermediate gear and pinion at the other end of the intermediate shaft, and independent means for controlling the driving connection between the respective engine-shaft pinions and the gearing driven therefrom, said driving-wheel gears being similar, and the gears and pinions at the opposite ends of the engine and intermediate shafts being also similar, whereby the two trains of gearing on opposite sides of the machine are identical in construction, substantially as described.

2. In a steam road-roller, the combination, with the boiler and its extension or horn plates, of a vertical integral housing secured to each extension-plate and having bearings therein for the engine-shaft, intermediate shaft and rear axle, an engine-shaft, intermediate shaft and rear axle mounted in said bearings in vertical alinement, driving-wheels mounted on the axle, and suitable gearing mounted on the engine and intermediate shaft and driving-wheels, substantially as described.

3. In a steam road-roller, the combination, with a boiler and extension-plates, of side housings mounted on the extension-plates, cross-plates connecting the upper ends of the side housings and provided with a central housing, said cross-plates being disconnected from the boiler, and an engine-shaft having its end bearings in the side housings and central bearing in said central housing, substantially as described.

In testimony whereof I affix my signature in presence of two witnesses.

THOMAS WRIGHT.

Witnesses:
 IRVINE MILLER,
 WILL O'LAUGHLIN.